Feb. 2, 1965  L. H. STRAUSS  3,168,611
LIGHT MODULATOR USING IMPROVED KERR CELL
Filed May 7, 1962  2 Sheets-Sheet 1
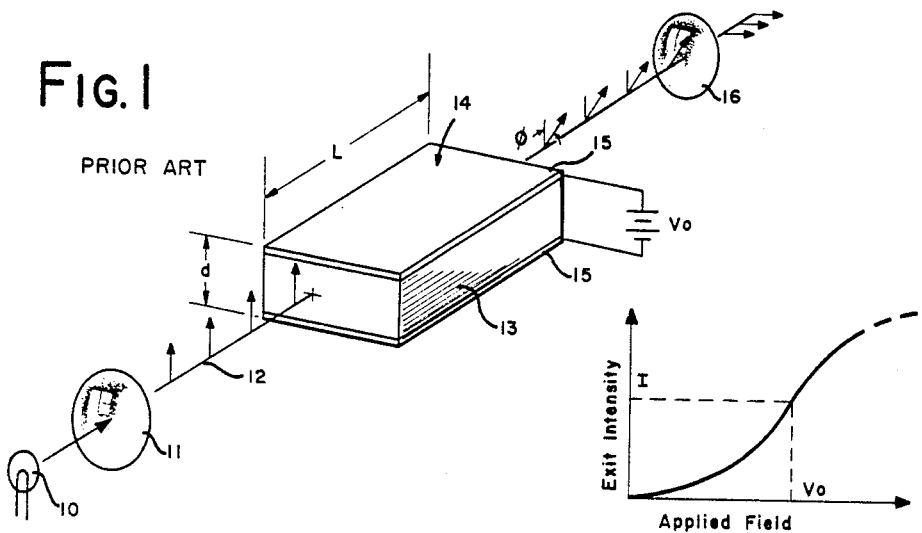
FIG. 1
PRIOR ART
FIG. 2
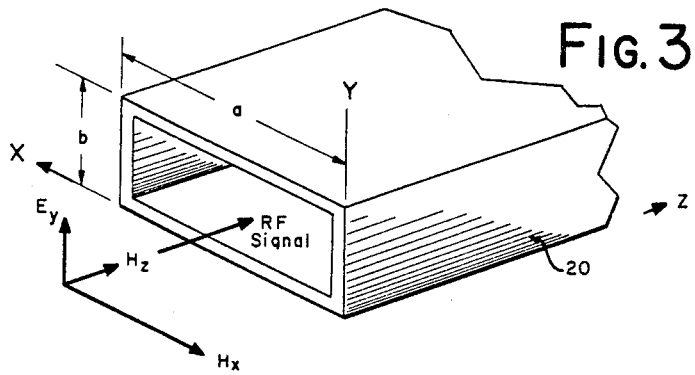
FIG. 3
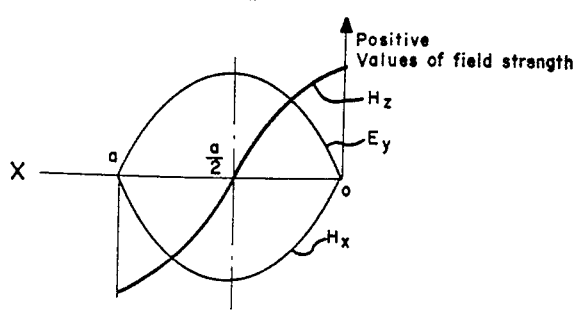
FIG. 4
LEWIS H. STRAUSS
INVENTOR.
BY THOMAS J. HOLDEN
DONALD M. SANDLER
ATTORNEYS

RF SIGNAL INPUT

RF SIGNAL OUTPUT

LEWIS H. STRAUSS
INVENTOR.

BY DONALD M. SANDLER
THOMAS J. HOLDEN
ATTORNEYS

United States Patent Office 3,168,611
Patented Feb. 2, 1965

3,168,611
LIGHT MODULATOR USING IMPROVED
KERR CELL
Lewis H. Strauss, Baltimore County, Md., assignor to
Aircraft Armaments, Inc., Cockeysville, Md., a corporation of Maryland
Filed May 7, 1962, Ser. No. 192,941
4 Claims. (Cl. 88—61)

This invention relates to light modulators, and more particularly to light modulators of the class utilizing Kerr cells.

Conventional Kerr cells comprise a pair of electrically conductive plates which are spaced apart and have therebetween an insulating liquid or solid that becomes double refracting due to an electric field in the insulating medium produced when a potential is applied across the plates. If a cell of the type described is placed between a polarizer and an analyzer that are oriented at right angles, plane polarized light entering the cell is extinguished by the analyzer in the absence of a transverse electric field in the medium. However, when such a field is present, plane polarized light entering the cell is elliptically polarized by the medium, and extinction of the emergent beam by the analyzer is no longer possible. Modulation of the emergent beam is accomplished by modulation of the electric field.

One possible way to modulate a beam of light at very high frequencies is to place a Kerr cell in an electromagnetic field. Where the energy is in the form of electromagnetic waves having a component of the electric field transverse to the direction of propagation, and plane polarized light is beamed through the Kerr cell in the direction of propagation of the waves, the plane of polarization of the light beam will be rotated due to the transverse electric field acting on the medium in the cell, and the light beam emerging from the analyzer will be modulated at twice the frequency of the waves.

One of the problems associated with the above-described technique is the relatively small values of electric field strength able to be applied to the Kerr medium by the electromagnetic waves, and the consequent small amount of rotation imparted to the plane of polarization. Since the exit intensity varies as the square of the sine of the angle rotation; and, for a Kerr cell, since the angle of rotation varies as the square of the applied electric field strength, the change of exit intensity with respect to change of field strength is very small at small values of field strength. If conventional microwave equipment is utilized to produce the electric field, the order of magnitude of the field strength is such that changes in the electric field changes the exit intensity by a very small amount with the result that modulation of the exit beam is difficult to detect with conventional equipment.

To overcome this, the present invention utilizes a D.C. bias to create a large non-varying transverse electric field that causes a preselected rotation of the plane of polarization upon which the rapidly changing smaller rotation or oscillation due to the transverse electric field of the electromagnetic waves is superimposed. In this manner, the operating point on the curve of exit intensity versus applied field is shifted to a region where the rate of change of exit intensity with respect to change of field strength is much larger than was the case previously described. This means that small changes in the electric field due to the presence of the electromagnetic waves makes a significant change in the exit intensity with the result that substantial modulation of the exit beam is achieved.

Briefly, the invention contemplates using H-waves, and incorporates the Kerr cell directly into the waveguide structure. This is accomplished by splitting the waveguide into two portions along lines where the transverse electric field of the H-waves is zero at all times, and electrically insulating the portions. Said portions define the electrodes of the Kerr cell and retain the Kerr medium in the waveguide. A large D.C. potential applied across the portions will bias the medium such that the microwave signal will satisfactorily amplitude modulate the emergent light beam.

Still other objects, features, and attendant advantages will become apparent to one skilled in the art from a reading of the following detailed description of one preferred physical embodiment constructed in accordance with the invention, taken in conjunction with the accompanying drawings, wherein FIGURE 1 is a schematic view of a conventional Kerr cell having a D.C. bias applied which imparts a predetermined rotation to the plane of the polarization of light entering the cell.

FIGURE 2 shows the shape of the response curve of a typical Kerr cell.

FIGURE 3 is a perspective view of a conventional section of wave guide showing the orientation of the vectors associated with a simple H-wave.

FIGURE 4 is a graph which provides the amplitude of each vector shown in FIGURE 3 as a function of traverse position in the guide.

Figure 5:
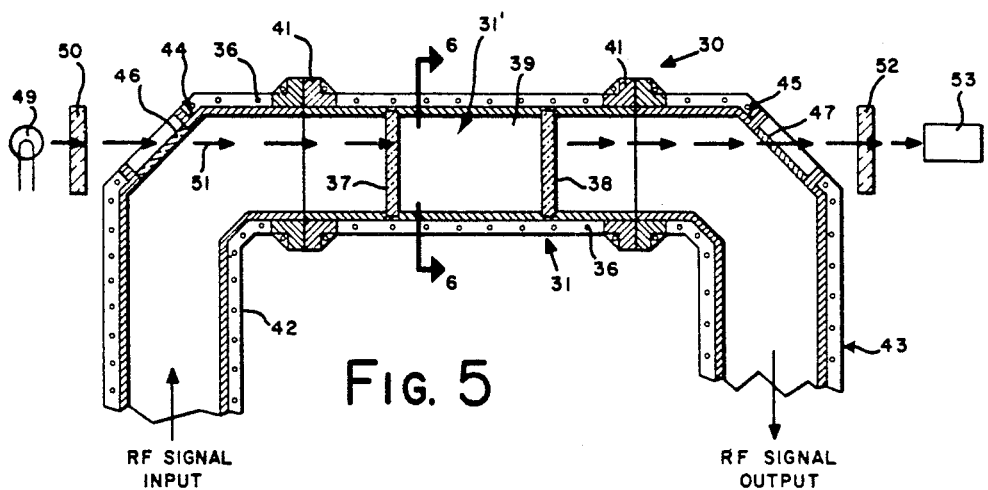
FIGURE 5 is a schematic sectional view of a Kerr cell incorporated into a section of wave guide in such a way as to achieve light modulation.
Figure 6:
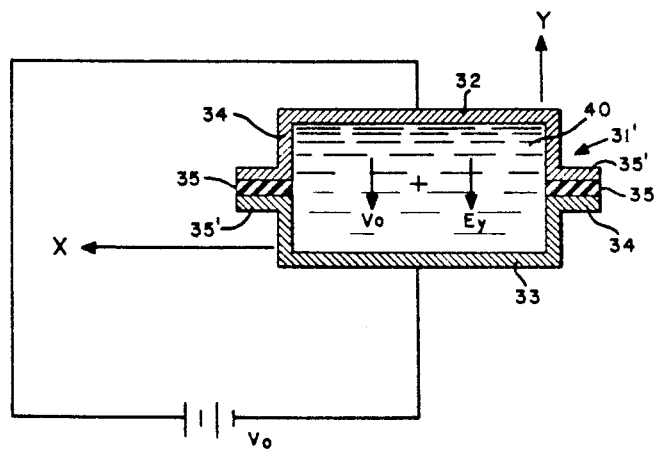
FIGURE 6 is a sectional view taken along the line 6—6 of FIGURE 5.

Referring now to FIGURE 1, light from source 10 is collimated and passed through polarizer 11 to produce a plane polarized beam 12 that passes through Kerr medium 13 of Kerr cell 14. Beam 12 may be represented as having vertical electric vectors. If voltage $V_0$ is applied to plates 15 of cell 14, the electric vectors of the beam are rotated and emerge making an angle $\phi$ with the vertical. Analyzer 16, oriented at right angles to polarizer 11 does not extinguish the incident beam because the latter now has a horizontal component.

If medium 13 has a Kerr constant K and is of length L, and the transverse field strength is $V/d$, the electric vector is rotated through the angle $$\phi = 2\pi KL\left(\frac{V}{d}\right)^2$$

If the intensity of the beam incident on analyzer 16 is $I_0$, the intensity of the emergent beam, I, is given by:

$$I = I_0 \sin^2 \phi = I_0 \sin^2\left(\frac{2\pi KL}{d^2}\right)V^2$$

A representation of this equation is shown in FIGURE 2, and its slope is given by:

$$\frac{dI}{dV} = I_0\frac{d}{dV}(\sin^2 \phi) = 2I_0 V\left(\frac{2\pi KL}{d^2}\right)\sin 2\phi$$

The change in the emergent intensity $\Delta I$ due to a small change in field strength $V_a$ when the applied field is $V_0$ is:

$$\Delta I = 2V_0 V_a I_0\left(\frac{2\pi KL}{d^2}\right)\sin 2\phi_0$$

where $\phi_0$ is the angle of rotation due to field $V_0$. Thus if $V_a = E_y \cos \omega t$, the modulation index m of the emergent beam when a steady field $V_0$ is impressed on the Kerr medium is given by:

$$m = \frac{\Delta I}{I} = 4E_y V_0\left(\frac{2\pi KL}{d^2}\right)\cot\left(\frac{2\pi KL}{d^2}\right)V_0^2$$

It is seen, then, that the modulation index can be made of significant value by adjusting the available variables.

To modulate the emergent beam at large frequencies, the field $V_a$ is established by the transverse electric field of an H-wave traveling in a waveguide containing the Kerr medium.

Referring now to FIGURE 3, there is shown a section of rectangular waveguide 20 of width $a$ and height $b$, with a set of coordinate axes X, Y and Z erected as indicated. For the simplest H-wave, the $TE_{10}$ mode, and propagation of the signal in the direction along the positive Z-axis, the only electric field $E_y$ is transverse to the direction of propagation and lies along the Y-axis. The magnetic field has a transverse component $H_x$ that lies along the X-axis and a parallel component $H_z$ that lies along the Z-axis.

For a lossless medium, the fields are described as follows:

$$E_y = E_0 \sin\left(\frac{\pi}{a}x\right) \exp(j\omega t - \beta_{10} z)$$

$$H_z = H_0 \cos\left(\frac{\pi}{a}x\right) \exp(j\omega t - \beta_{10} z)$$

$$H_x = H_0 \sin\left(\frac{\pi}{a}x\right) \exp(j\omega t - \beta_{10} z)$$

where $E_0$ and $H_0$ are the amplitudes of the electric and magnetic field, respectively, $\omega$ is the angular frequency of the microwave signal, and $B_{10}$ is the phase constant.

At some instant of time and some value of displacement along the direction of propagation, the relationship between each of the three fields and the transverse displacement is shown in FIGURE 4. It is apparent that the electric field is a maximum at $X = a/2$. It should be understood, of course, that when the electric field is a positive maximum at one value of $z$, it is zero at a distance $\pi/2\beta_{10}$ further down the waveguide, and a negative maximum a distance of $3\pi/2\beta_{10}$. At a time $2\pi/\omega$ later, the electric field at said one value of $z$ is zero, while at a distance $\pi/2\beta_{10}$ it is a positive maximum, and at a distance $3\pi/2\beta_{10}$ it is also zero, etc.

Because the electric field of the H-wave is propagated through the waveguide at the phase velocity $$V_P = \frac{\omega}{\beta_{10}}$$

which exceeds the velocity of light $c$, a light beam element sent through the waveguide in the direction of propagation would experience an electric field that changes direction after a time $$t = \frac{V_P}{2f(V_P - c)}$$

where $f$ is the microwave frequency. Therefore, the length L over which a light element experiences an unidirectional electric field of the H-wave is:

$$L = \frac{V_P c}{2f(V_P - c)}$$

FIGURE 5 is a preferred embodiment 30 for subjecting plane polarized light to a steady transverse electric field and a rapidly varying smaller transverse electric field. Embodiment 30 includes a main waveguide section 31 which is split into top portion 32 and bottom portion 33 half-way up the sides 34. Since the electric field on the sides is zero, this has no effect on the operation of the waveguide. Insulating material 35 is interposed between flanges 35' formed on the waveguide portions for electrically insulating the same. The two portions are clamped together in a manner that does not interfere with this insulation, and this is shown schematically by bolts 36.

Section 31 is used to define part of the boundaries of Kerr cell 31'. The end faces 37 and 38 of the cell are shown schematically as glass plates attached to the section transverse thereto to define a chamber 39 within which is Kerr medium 40. A suitable medium is nitrobenzene, although other materials could be used. A steady transverse electric field is established across cell 31' by applying a D.C. potential across portions 32 and 33. This is shown schematically by battery $V_0$.

Section 31 is provided with flange 41 at each end for attachment to corresponding flanges on the ends of input waveguide section 42 and output waveguide section 43. Sections 42 and 43 contain elbow portion 44 and 45 in which transparent windows 46 and 47 effect passage of a narrow collimated light beam through the center 48 of Kerr cell 31' in the direction of propagation. Light source 49 produces such a light beam, and polarizer 50 in the path of this beam produces a plane polarized beam 51 prior its passage through cell 31'.

Analyzer 52 is in the path of the light beam after it emerges from cell 31'. Polarizer 50 and analyzer 52 are oriented at right angles so that in the absence of an external field in cell 31', the light beam is extinguished by the analyzer.

In operation, cell 31' is biased by battery $V_0$ to the desired operating point on the characteristic curve of the cell (FIGURE 2). Microwave energy ($TE_{10}$ mode) is admitted to section 42 where it is caused to be propagated through cell 31'. If the frequency of the microwave is $f$, the length of the cell to achieve maximum rotation of the electric vector of the light beam is $$L = \frac{V_P c}{2f(V_P - c)}$$

In the Kerr medium, the electric vector of the light beam is caused to rotate through a pre-selected angle due to the transverse electric field created by battery $V_0$. Upon this rotation is superimposed an oscillation of the electric vector (at twice the microwave frequency) due to the traverse electric field of the H-wave.

The beam emerging from analyzer 52 is thus intensity modulated by the microwave signal and can be detected at 53. While the Kerr cell shown in the drawing is exposed to a traveling wave, it could also be used with a standing wave by placing it in a resonant cavity. In addition, alternative methods of construction could employ coaxial cables, strip lines, or other systems for propagating RF energy.

It should be understood that electromagnetic waves other than H-waves could be utilized, and that the latter are referred to herein for purposes of convenience. Any type of wave, of course, could be used, provided it has a component of electric field transverse to the direction of the light beam. The above described invention is particularly suited to the modulation of light of various (or any) frequency since the D.C. bias will rotate the plane of polarization equally for all frequencies of the light beam.

What is claimed is:

1. A light modulator comprising:
   a section of waveguide through which electromagnetic waves are propagated;
   means for effecting passage of a light beam through said section in the direction of propagation;
   a light source for producing a light beam;
   polarizing means in the path of said beam for plane polarizing the same prior to its passage through said section;
   analyzer means in the path of said beam for analyzing the same after its passage through said section;
   said polarizing means and analyzer being oriented at right angles so that said analyzer means normally extinguishes the light beam after its passage through said section;
   a Kerr cell in said section through which said beam passes for causing its plane of polarization to rotate in proportion to the transverse electric field of said electromagnetic waves whereby said analyzer effects passage of a light beam modulated by the electric field of said waves;
   electrodes on said Kerr cell; and means to produce across said electrodes a D.C. potential that creates a non-varying transverse electric field for causing a preselected rotation of the plane of polarization of said beam, upon which, rotation due to the transverse electric field of said waves is superimposed.

2. A light modulator comprising:

a section of waveguide through which electromagnetic waves are propagated;

means for effecting passage of a light beam through said section in the direction of propagation;

a light source for producing a light beam;

polarizing means in the path of said beam for plane polarizing the same prior to its passage through said section;

analyzer means in the path of said beam for analyzing the same after its passage through said section;

said polarizing means and analyzer being oriented at right angles so that said analyzer means normally extinguishes the light beam after its passage through said section;

a Kerr cell in said section through which said beam passes for causing its plane of polarization to rotate in proportion to the transverse electric field of said electromagnetic waves whereby said analyzer effects passage of a light beam modulated by the electric field of said waves;

said electromagnetic waves being H-waves;

said waveguide section being split into two portions along a line where the transverse electric field of said H-waves is zero at all times;

insulation means being provided between said portions for electrically insulating the same; and means to produce across said portions a D.C. potential that creates across said Kerr cell a non-varying transverse electric field for causing a preselected rotation of the plane of polarization of said beam upon which rotation due to the transverse electric field of said H-waves is superimposed.

3. A light modulator in accordance with claim 2 wherein said portions define a part of said Kerr cell.

4. A light modulator comprising:

a section of an A.C. electromagnetic energy guide through which A.C. electromagnetic energy is propagated;

means for effecting passage of a light beam through said section;

means for forming a planar polarized light beam directed through said section;

analyzer means in the path of said beam for analyzing the same after its passage through said section;

a Kerr cell in said section through which said beam passes for causing its plane of polarization to rotate in proportion to the transverse electric field of said electromagnetic energy whereby said analyzer effects passage of a light beam modulated by the electric field of said A.C. electromagnetic energy;

electrodes on said Kerr cell;

means to produce across said electrodes a D.C. potential that creates a non-varying transverse electric field for causing pre-selected rotation of the plane of polarization of said beam, upon which rotation due to the transverse electric field of said A.C. electromagnetic energy is superimposed.

References Cited in the file of this patent

UNITED STATES PATENTS

| 2,666,363 | Beams et al. | Jan. 19, 1954 |
| 2,913,665 | Bomke | Nov. 17, 1959 |